A. ENGLE.
MEANS FOR DISPOSING OF WASTE PRODUCTS AND CONSERVING CHEMICAL CONSTITUENTS THEREOF.
APPLICATION FILED DEC. 2, 1918.
1,354,733. Patented Oct. 5, 1920.
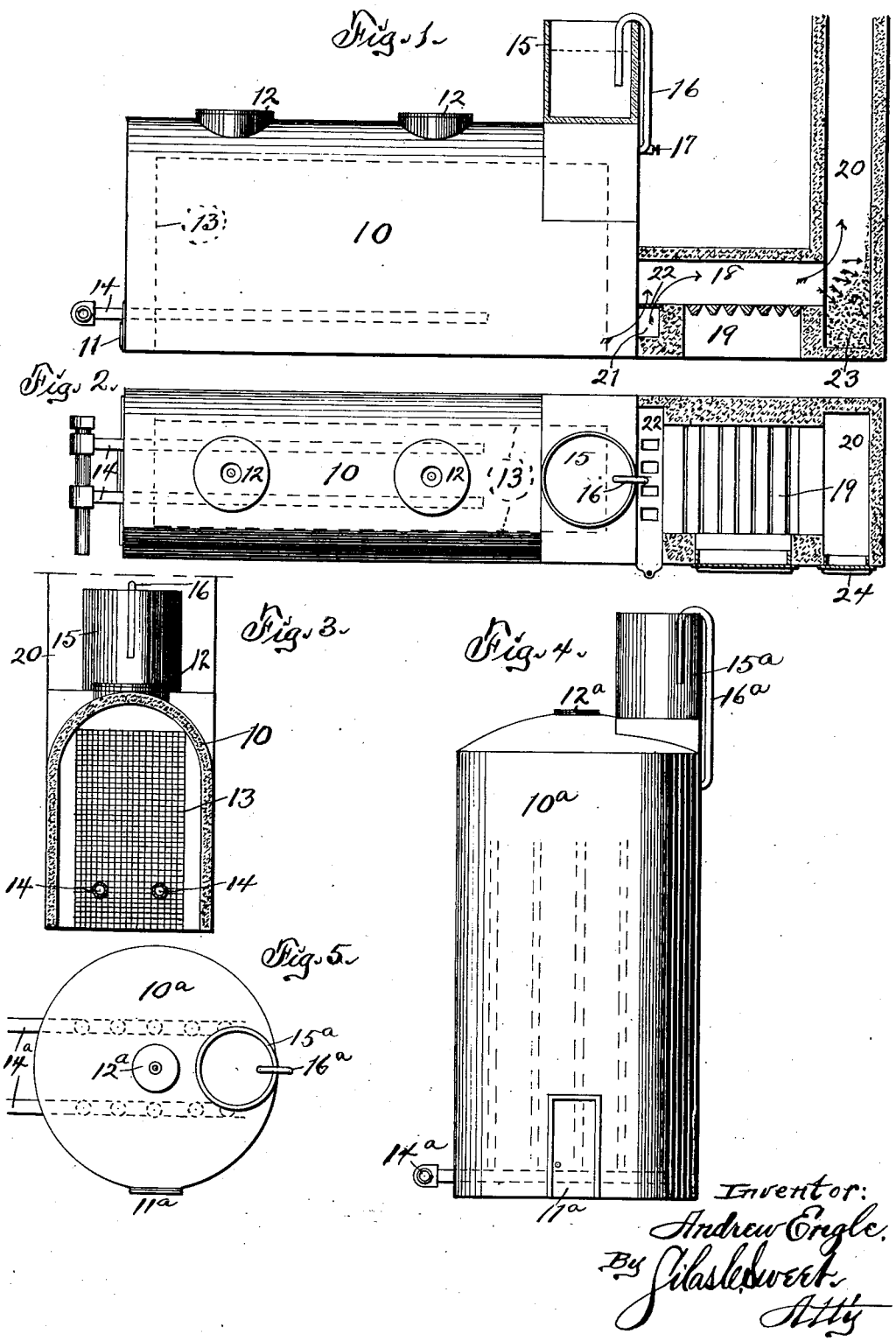

UNITED STATES PATENT OFFICE.

ANDREW ENGLE, OF MOUND PRAIRIE TOWNSHIP, JASPER COUNTY, IOWA, ASSIGNOR OF ONE-HALF TO JAMES J. ENGLE, OF MOUND PRAIRIE TOWNSHIP, IOWA.

MEANS FOR DISPOSING OF WASTE PRODUCTS AND CONSERVING CHEMICAL CONSTITUENTS THEREOF.

1,354,733.

Specification of Letters Patent.

Patented Oct. 5, 1920.

Application filed December 2, 1918. Serial No. 264,976.

*To all whom it may concern:*

Be it known that I, ANDREW ENGLE, a citizen of the United States of America, and resident of Mound Prairie township, Jasper county, Iowa, have invented a new and useful Means for Disposing of Waste Products and Conserving Chemical Constituents Thereof, of which the following is a specification.

The object of this invention is to provide means for disposing of waste products such as night-soil, garbage, weeds, dead animals and similar or associated rubbish usually gathered and removed from cities and towns, and conserving and utilizing chemical constituents thereof such as nitrates and ammonia.

My invention consists in the construction, arrangement and combination of elements hereinafter set forth, pointed out in my claims and illustrated by the accompanying drawing, in which—

Figure 1 is a side elevation, partly in section, illustrating one form of means for carrying out my object. Fig. 2 is a plan of the same, also partly in section. Fig. 3 is a front elevation of the same, also partly in section, the front wall being removed to reveal interior construction.

Figs. 4 and 5 are side elevation and plan respectively of another, or modified, form of means for carrying out my object.

In the construction of the means shown in Figs. 1, 2 and 3, the numeral 10 designates a container, housing, vault, structure or building, of generally rectangular form in plan, provided with end walls and an arched roof. This structure preferably is composed or built up of concrete, either monolithic or blocks, but for reasons hereinafter mentioned it may be found desirable to construct it of unbaked clay or sun-dried bricks such as adobe. However the substance of the structure 10 is not immediately important, other characteristics and the use of said structure commanding principal attention. The housing 10 may be of any desired dimension; but in this connection attention is directed to the desirability that said housing have relatively large capacity, such, for instance, as would care for the scavenged products of a given area for a week. The housing preferably is provided with a door 11 in one wall and man-holes or ingress ports in its roof, the latter being closable, and ordinarily closed, by covers 12. A cage 13, preferably made of woven wire, is located within and spaced from the walls of the housing 10 and said cage is open at its top and surrounds the manholes in the roof of the structure. The spacing of the cage from the walls of the structure preferably is sufficient for the passing or travel of a man around the cage. A series of air-supply pipes 14, in any desired number, is mounted through one wall of the housing 10 and extends within the cage 13. Air, under pressure, is supplied to the pipes 14 in any desired manner such as by attachment of an air-pump (not shown) to said pipes exteriorly of the structure. A container 15, or jar, preferably made of vitrified clay or glass, is mounted in any suitable location such as on one end portion of the structure 10, and a discharge pipe 16, preferably controlled by a valve 17, communicates at one end with the interior of the upper portion of the structure 10 and is recurved and communicates at the other end with the interior of the container 15. The terminal end of the pipe 16 preferably is submerged in a liquid, such as sulfuric acid, within the container 15. A furnace is located adjacent to the structure 10 and is provided with a fire box 18, grate 19 and chimney 20. On the grate 19 a fire is maintained and the fuel therefor preferably is high in sulfur content and may be largely composed of sulfur balls. Communication is provided between the fire box 18 and the interior of the structure 10, such as by a box 21, and said communication is controlled by a valve or damper 22.

In practical use of the means thus far described, the cage 13 is filled, through the manholes, with the waste products and refuse, and lime, preferably dissolved in water, is applied to the mass in the cage in proportions sufficient to limit acid development and for disinfecting purposes therein. After the cage is filled, the manholes are covered and the mass is allowed to rest to establish putrefaction, then air is pumped or introduced under pressure to the mass through the pipes 14 to the end of thoroughly aerating and ventilating the mass. In passing through the mass the air becomes saturated with ammonia and carries said ammonia out of the structure in either of two ways, viz. through the pipe 16 and bath in the container 15 to the end of absorbing the ammonia in said bath, or, through the fire box 18 to the end of commingling said ammonia with the sulfur fumes and depositing it in a soot as indicated by the deposit 23 in Fig. 1. The selective withdrawal of the ammonia is under control of the valves 17 and 22 and may be directed as desired. The ammonia-bearing soot may be withdrawn through a door 24 provided at the base of the chimney and the contents of the container 15 may be removed; and the products thus obtained may be further treated in any desired manner for commercializing them. During the operation of aerating the mass and drawing off the ammonia therefrom, said mass undergoes a physical and chemical transformation, or more than one such transformation. It is deodorized, dried, and decomposed, and becomes a fertilizing composition high in nitrate content susceptible of grinding and packaging for commerce. Or the dried mass may be consumed by fire and will yield a large proportion of potash of commercial value. In the latter event, the furnace and chimney will provide draft for combustion in connection with air supplied through the door 11 or pipes 14.

Sometimes it is desirable to utilize the dried mass as a fertilizer on land surrounding or contiguous to the structure, and it is convenient and economical to make the walls and roof of the structure of sun-dried clay in order that the structure may be broken down and commingled with the dried mass and thus add bulk and soil elements to the fertilizer. In such condition, also, the clay component of the structure carries into the resultant composition a quantity of ammonia absorbed therein. Various bacteria useful in the development of plant life are propagated in the dried mass, kept sweet by the lime and air. Thus considerable tracts of land may be reclaimed and made fit for agriculture through utilizing waste products locally.

In the construction of the means as shown in Figs. 4 and 5 the numeral 10ª designates a structure or housing of cylindrical form, with an arched or dome-shaped roof having a manhole or ingress port closable, and normally closed, by a cover 12ª and a door is provided in the wall as 11ª. Suitable air-supply pipes 14ª enter the structure through and near the bottom of the wall. The wire cage may be omitted. A container 15ª is mounted on the roof of the structure 10ª and a discharge pipe 16ª leads from the upper portion of the structure, is recurved, enters and terminates with an open end within said container and said terminal end of said pipe preferably is submerged in a bath such as of sulfuric acid in said container. The furnace also may be omitted.

In practical use of the means illustrated in Figs. 4 and 5, the structure 10ª is filled with rubbish and waste products through the manhole and the mass is treated as desired with lime. Then the manhole is closed and the mass is aerated by means of the pipes 14ª, the air employed becoming saturated with ammonia and discharging into the bath in the container 15ª. After the mass is dried and transformed to the desired extent it may be removed through the doorway, or, the mass may be fired in the structure by removing the cover 12ª and providing draft through the doorway, and, then, the resultant ash may be utilized.

Any mineral substances contained in the rubbish or waste products are ignored in this operation.

The processes described in this connection are covered in my companion application for patent, filed December 2, 1918, Serial Number 264,975.

I claim as my invention—

1. Means for disposing of waste products and conserving chemical constituents thereof, comprising a structure, a cage within and spaced from the walls of said structure, said structure being provided with openings through which material may be passed for filling said cage with waste products, means for containing an ammonia collecting or precipitating medium, and means for passing air currents successively through said mass of waste products and said medium.

2. In means for disposing of waste products and conserving chemical constituents thereof, the combination of a structure, a container surmounting the safe, a pipe communicating between the interiors of said structure and container, said structure being provided with openings through which material may be passed, and air pipes or aerating means entering said mass.

3. In means for disposing of waste products and conserving chemical constituents thereof, the combination of a structure, a furnace communicating therewith, said structure being provided with openings through which material may be passed, and means for aerating said mass and driving currents from the structure to the furnace, said furnace being adapted to burn fuel high in sulfur content.

4. In means for disposing of waste products and conserving chemical constituents thereof, the combination of a structure, a container for an ammonia-collecting bath, a valve-controlled pipe communicating between said structure and container and discharging into said bath, a furnace adapted to burn fuel high in sulfur content, valve-controlled means of communication between said structure and the fire-box of said furnace, said structure being provided with openings through which material may be passed, and means for aerating said mass in said structure and driving ammonia-laden air to said pipe and furnace respectively.

Signed at Des Moines, in the county of Polk and State of Iowa, this 21st day of October, 1918.

ANDREW ENGLE.